US008675324B2

(12) United States Patent
Noguchi

(10) Patent No.: US 8,675,324 B2
(45) Date of Patent: Mar. 18, 2014

(54) SHORT-CIRCUIT ISOLATOR

(75) Inventor: Takahiro Noguchi, Tokyo (JP)

(73) Assignee: Nohmi Bosai Ltd., Tokyo (JP)

( * ) Notice: Subject to any disclaimer, the term of this patent is extended or adjusted under 35 U.S.C. 154(b) by 253 days.

(21) Appl. No.: 13/012,559

(22) Filed: Jan. 24, 2011

(65) Prior Publication Data

US 2011/0181992 A1 Jul. 28, 2011

(30) Foreign Application Priority Data

Jan. 25, 2010 (JP) ................................ 2010-013174

(51) Int. Cl.
*H02H 3/08* (2006.01)
*H02H 9/02* (2006.01)

(52) U.S. Cl.
USPC .............. 361/63; 361/87; 361/93.1; 361/93.7

(58) Field of Classification Search
USPC .................................. 361/63, 87, 93.1, 93.7
See application file for complete search history.

(56) References Cited

U.S. PATENT DOCUMENTS

| | | | | | |
|---|---|---|---|---|---|
| 3,214,673 | A * | 10/1965 | Jentje | 363/77 |
| 3,663,860 | A * | 5/1972 | Phillips | 315/200 R |
| 4,477,747 | A * | 10/1984 | Wakai et al. | 315/200 A |
| 5,097,259 | A * | 3/1992 | Testa et al. | 340/6.1 |
| 5,631,795 | A | 5/1997 | Koyama | |
| 6,222,709 | B1 * | 4/2001 | Baba | 361/18 |
| 7,042,280 | B1 * | 5/2006 | Huang et al. | 327/541 |

FOREIGN PATENT DOCUMENTS

| | | | |
|---|---|---|---|
| CN | 2840439 | Y | 11/2006 |
| CN | 201044350 | Y | 4/2008 |
| GB | 2 168 517 | A | 6/1986 |
| JP | S63-019097 | A | 1/1988 |

OTHER PUBLICATIONS

Extended European search report issued in the counterpart European Application No. 11 151 204.2 dated Feb. 14, 2012 (5 pages).
Office Action issued in counterpart Chinese Application No. 201110026304.1 dated Dec. 5, 2012 (9 pages).

* cited by examiner

*Primary Examiner* — Rexford Barnie
*Assistant Examiner* — Zeev V Kitov
(74) *Attorney, Agent, or Firm* — Fitch, Even, Tabin & Flannery, LLP

(57) ABSTRACT

Provided is a short-circuit isolator capable of earlier detection of recovery from short circuit of a disconnected line and reconnecting the line. The short-circuit isolator includes: a switch for switching a connection state between a primary signal line and a secondary signal line; a short-circuit monitor circuit which is connected to a primary wiring of the switch through a resistor as a current limiting section and connected to a secondary wiring of the switch, for detecting short circuit when a voltage of the secondary signal line is lower than a short-circuit detection threshold and detecting recovery from the short circuit when the voltage of the secondary signal line is higher than a short-circuit recovery threshold which is a voltage value lower than the short-circuit detection threshold after the short circuit is detected; and a switch control section for turning off the switch when the short circuit is detected by the short-circuit monitor circuit and turning on the switch when the recovery from the short circuit is detected by the short-circuit monitor circuit.

7 Claims, 7 Drawing Sheets

SHORT-CIRCUIT ISOLATOR

CROSS-REFERENCE TO RELATED APPLICATION

This application claims priority under 35 U.S.C. §119 to Japanese Patent Application No. JP2010-013174 filed Jan. 25, 2010, the entire contents of which is hereby incorporated by reference.

FIELD OF THE INVENTION

The present invention relates to a short-circuit isolator.

BACKGROUND OF THE INVENTION

As a conventional short-circuit isolator, there is known "short-circuit detection means for detecting the short circuit of a line when an input line voltage of the line is equal to or lower than a predetermined threshold line voltage" (see, for example, Japanese Patent Application Laid-open No. Sho 63-19097 (pages 3 and 5, FIG. 1)).

In the technology described in Japanese Patent Application Laid-open No. Sho 63-19097, when the voltage of the line is equal to or lower than the predetermined threshold line voltage, the short circuit is detected and a short-circuit section is disconnected. When the voltage of the line is higher than the predetermined threshold line voltage, the recovery from short circuit is detected and the disconnected section is reconnected.

However, the threshold line voltage for detecting the short circuit is equal to the threshold line voltage for detecting the recovery from short circuit, and hence it takes time to reconnect the section disconnected by the short-circuit detection means after the actual recovery from short circuit.

SUMMARY OF THE INVENTION

The present invention has been made to solve the problem as described above. An object of the present invention is to provide a short-circuit isolator capable of earlier detection of recovery from short circuit of a disconnected line and reconnecting the line.

According to the present invention, there is provided a short-circuit isolator for detecting short circuit of a signal line, including: switch means for switching a connection state between a primary signal line and a secondary signal line; short-circuit determination means which is connected to a primary wiring of the switch means through current limiting means and connected to a secondary wiring of the switch means, for detecting short circuit when a voltage of the secondary signal line is lower than a short-circuit detection threshold and detecting recovery from the short circuit when the voltage of the secondary signal line is higher than a short-circuit recovery threshold which is a voltage value lower than the short-circuit detection threshold after the short circuit is detected; and switch control means for turning off the switch means when the short circuit is detected by the short-circuit determination means and turning on the switch means when the recovery from the short circuit is detected by the short-circuit determination means.

According to the present invention, there is also provided a short-circuit isolator to be connected to a signal line which is applied with a voltage from both sides, for detecting short circuit of the signal line, including: first switch means and second switch means which are connected in series between a primary signal line and a secondary signal line; first short-circuit determination means which is connected, through current limiting means, to a connection side wiring for connecting the first switch means to the second switch means, and which is connected to a primary wiring for the first switch means which is opposite from the connection side wiring, for detecting short circuit when a voltage of the primary signal line is lower than a first short-circuit detection threshold and detecting recovery from the short circuit when the voltage of the primary signal line is higher than a first short-circuit recovery threshold which is a voltage value lower than the first short-circuit detection threshold after the short circuit is detected; first switch control means for turning off the first switch means when the short circuit is detected by the first short-circuit determination means and turning on the first switch means when the recovery from the short circuit is detected by the first short-circuit determination means; second short-circuit determination means which is connected to the connection side wiring through current limiting means and connected to a wiring of the second switch means which is opposite from the connection side wiring, for detecting short circuit when a voltage of the secondary signal line is lower than a second short-circuit detection threshold and detecting recovery from the short circuit when the voltage of the secondary signal line is higher than a second short-circuit recovery threshold which is a voltage value lower than the second short-circuit detection threshold after the short circuit is detected; and second switch control means for turning off the second switch means when the short circuit is detected by the second short-circuit determination means and turning on the second switch means when the recovery from the short circuit is detected by the second short-circuit determination means.

The short-circuit isolator according to the present invention further includes: third switch means for switching a connection state of a signal line extended from the connection side wiring for connecting the first switch means to the second switch means; third short-circuit determination means which is connected to the connection side wiring of the third switch means through current limiting means and connected to a wiring which is opposite from the connection side wiring, for detecting short circuit when a voltage of the extended signal line is lower than a third short-circuit detection threshold and detecting recovery from the short circuit when the voltage of the extended signal line is higher than a third short-circuit recovery threshold which is a voltage value lower than the third short-circuit detection threshold after the short circuit is detected; and third switch control means for turning off the third switch means when the short circuit is detected by the third short-circuit determination means and turning on the third switch means when the recovery from the short circuit is detected by the third short-circuit determination means.

In the short-circuit isolator according to the present invention, the short-circuit determination means includes a Zener diode which is connected to a wiring on one end side of the switch means through the current limiting means and connected to a wiring on another end side of the switch means and a capacitor connected in parallel to the Zener diode.

In the short-circuit isolator according to the present invention, the switch control means includes a switching element to be turned on in accordance with a current flowing through one of the Zener diode and the capacitor.

According to the short-circuit isolator of the present invention, the threshold voltage for detecting the recovery from short circuit is set to the voltage lower than the threshold voltage for detecting the short circuit, and hence the recovery from short circuit may be detected earlier. Therefore, for example, when the short-circuit isolator according to the present invention is applied to a signal system of a fire alarm system, a period from the recovery from short-circuit of the signal line to the restart of operation of the signal system may be shortened, and hence an operation stop time caused by the short circuit may be shortened.

The short-circuit isolator according to the present invention may be connected to a loop signal line applied with a voltage from both sides.

The short-circuit isolator according to the present invention may be connected to a signal line extended from the loop signal line.

The short-circuit isolator according to the present invention may include a simple circuit in which a Zener diode and a capacitor are provided in combination, and thus may be manufactured at low cost.

DETAILED DESCRIPTION OF THE PREFERRED EMBODIMENTS

First Embodiment

In a first embodiment, description is given of an example of the case where a short-circuit isolator (hereinafter, referred to as SCI) according to the present invention is applied to a fire alarm system including a so-called R-type fire alarm control panel, which transmits/receives a transmission signal (pulse signal) to cause sounder equipment to generate an alarm when a fire is detected by a fire detector or the like.

[Fire Alarm System]

(Overall Configuration)

A fire alarm system in the first embodiment is described.

Figure 1:
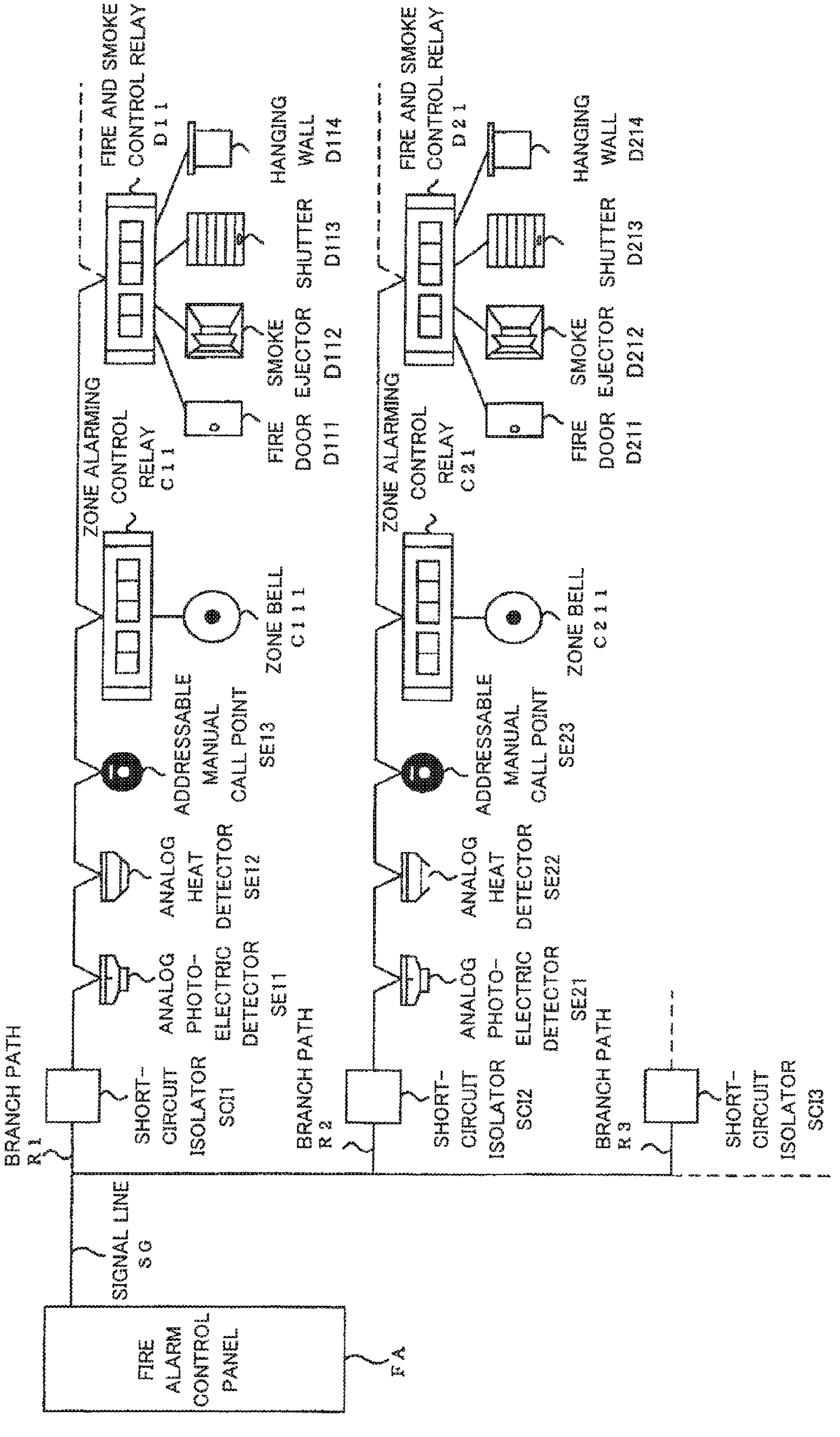
FIG. 1 is an overall configuration diagram illustrating a fire alarm system including a short-circuit isolator (SCI) according to a first embodiment of the present invention.
Figure 2:
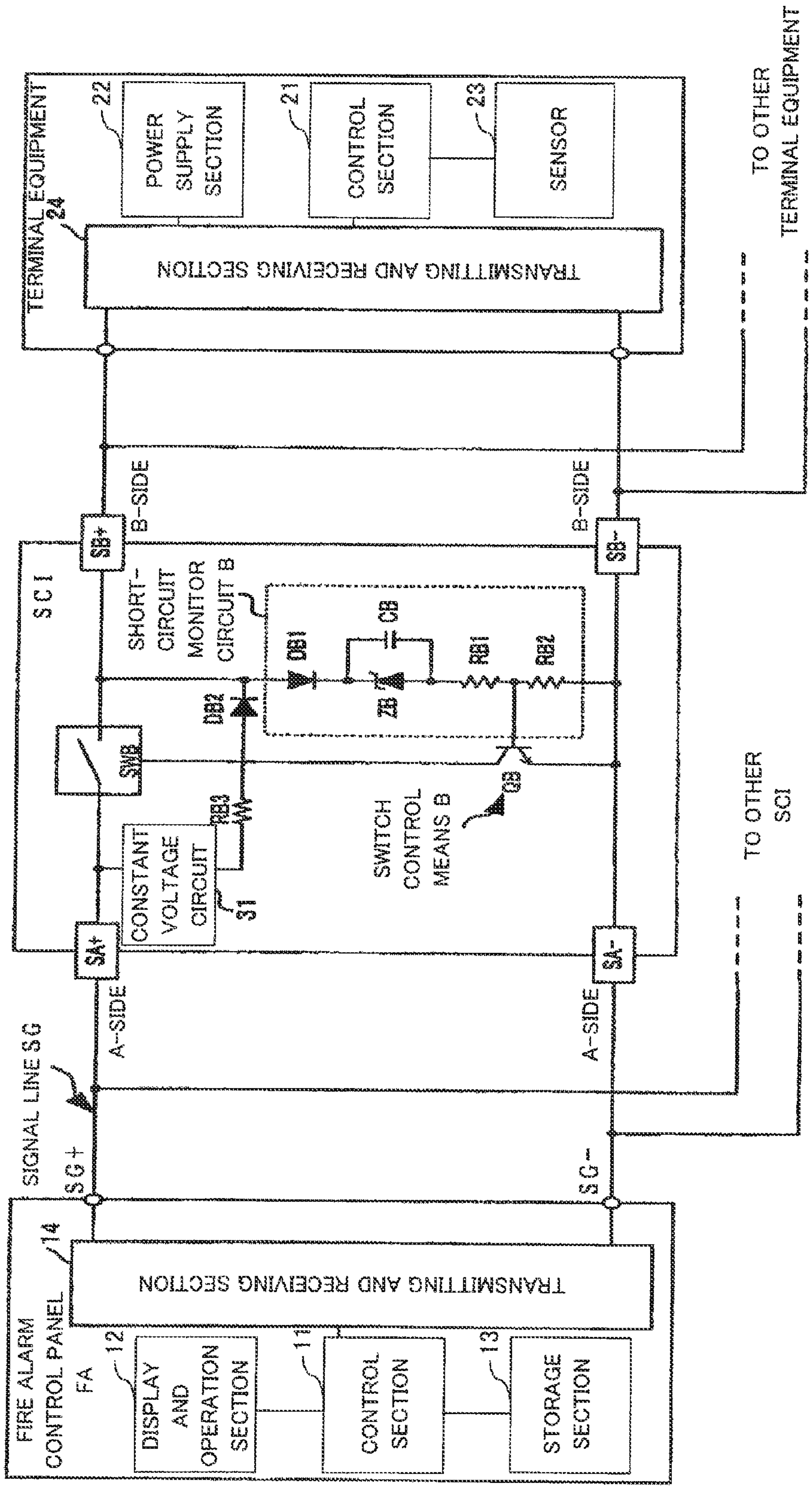
FIG. 2 is a block diagram illustrating the fire alarm system in the first embodiment of the present invention.

FIG. 1 is an overall configuration diagram illustrating the fire alarm system in the first embodiment. FIG. 2 is a configuration block diagram illustrating the fire alarm system in the first embodiment. A fire alarm control panel FA is connected to various types of terminal equipment through a signal line SG.

The signal line SG is divided into a plurality of branch paths. The short-circuit isolators SCI1 to SCI3 (hereinafter may be referred to simply as SCIs) are connected to the roots of the respective branch paths. FIG. 1 illustrates three paths, that is, branch paths R1, R2, and R3. However, the number of branch paths is not particularly limited.

The branch path R1 of the signal line SG is connected to an analog photoelectric detector SE11, an analog heat detector SE12, an addressable manual call point SE13, a zone alarming control relay C11, and a fire and smoke control relay D11. In the first embodiment, the equipment (except SCIs) connected to the fire alarm control panel FA through the signal line SG may be collectively referred to as terminal equipment.

The analog photoelectric detector SE11 is a kind of smoke detector and transmits an analog value corresponding to detected smoke to the fire alarm control panel FA.

The analog heat detector SE12 is a kind of heat detector and transmits an analog value corresponding to a detected ambient temperature to the fire alarm control panel FA.

The addressable manual call point SE13 is a so-called fire manual call point, and includes a manually-operated push button for a person to discover a fire. When the push button is turned on, a fire signal is transmitted to the fire alarm control panel FA.

The zone alarming control relay C11 is connected to a zone bell C111 serving as controlled equipment.

The zone bell C111 is a bell that sounds.

The fire and smoke control relay D11 is connected to a fire door D111, a smoke ejector D112, a shutter D113, and a hanging wall D114. In FIG. 1, the above-mentioned fire and smoke control equipment as controlled equipment is connected one by one, but a plurality of the fire and smoke control equipment may be connected.

The branch paths R2 and R3 are connected to various types of terminal equipment.

The terminal equipment connected to the signal line SG is communicated with the fire alarm control panel FA through the signal line SG and applied with power supply voltages through the signal line SG.

(Operation of Fire Alarm System)

An example of an operation of the fire alarm system is described.

When smoke is detected by the analog photoelectric detector SE11 connected as the terminal equipment or when heat is detected by the analog heat detector SE12, detection information is transmitted as state information to the fire alarm control panel FA through the signal line SG.

The fire alarm control panel FA collects the state information transmitted from the analog photoelectric detector SE11 or the analog heat detector SE12. When fire information (detection information which exceeds predetermined threshold) is included in the collected state information, a fire alarm is generated. To be specific, the fire alarm control panel FA transmits a control signal to the zone alarming control relay C11 to sound the zone bell C111, to thereby inform people about fire. In addition, the fire alarm control panel FA transmits a control signal to the fire and smoke control relay D11 to operate the fire door D111, the smoke ejector D112, the shutter D113, and the hanging wall D114, to thereby prevent the spread of fire.

When a branch path of the signal line SG is short-circuited, the short-circuited branch path is disconnected by the SCI connected to the root thereof in order to prevent the other branch paths of the signal line SG from being affected by short circuit. Note that the SCIs are described later.

(Communication Operation)

Communications between the fire alarm control panel FA and the terminal equipment are described.

The fire alarm control panel FA communicates with the terminal equipment through a pulse signal which is a combination of a high-level voltage (V1H) and a low-level voltage (V1L).

(1) Normal Communication Method

The fire alarm control panel FA communicates with the respective terminal equipment in order to collect the state information of the respective terminal equipment (see FIG. 1) connected to the signal line SG.

The fire alarm control panel FA may use the following three types of methods for the respective terminal equipment to collect the state information of the terminal equipment and to control the terminal equipment.

(1-1) Point Polling

The fire alarm control panel FA transmits a state information request command to each group of a plurality of terminal equipment in order to collect the states of the plurality of connected terminal equipment. In contrast to this, each of the terminal equipment returns state information to the fire alarm control panel FA at a timing based on its own address in response to the state information request command. The fire alarm control panel FA repeats communication with each group to collect the state information of all the terminal equipment.

(1-2) Selecting

The fire alarm control panel FA may specify an address corresponding to desired terminal equipment and transmit a predetermined control command to control the corresponding terminal equipment, or transmit, for example, the state information request command to desired terminal equipment to collect the state information from the terminal equipment. The terminal equipment having the specified address returns a control result to the fire alarm control panel FA in response to the control command or returns the requested state information.

(1-3) System Polling

The fire alarm control panel FA may transmit a common control command to all the terminal equipment to control the respective terminal equipment. Examples of the control command in system polling include a fire recovery command (command for recovering, to normal monitoring state, detector or relay which has output the fire signal) and a zone alarming stop command (command for stopping zone bell which is sounding).

(2) Collection of Information of Abnormal State

When fire information is included in the state information collected from terminal equipment, for example, the analog photoelectric detector SE11 by point polling, the fire alarm control panel FA transmits a control signal by selecting to a relay (zone alarming control relay or fire and smoke control relay) corresponding to the terminal equipment which has transmitted the fire information, based on a database stored in a storage section 13, to operate a zone bell and a fire and smoke control device. In a case where the state information request command is transmitted by point polling to the terminal equipment registered in the database stored in the storage section 13 of the fire alarm control panel FA, when terminal equipment does not reply in response to the state information request command, a no-response failure alarm is generated by a display and operation section 12.

[Block Diagram of Fire Alarm System]

A detailed configuration of the fire alarm system is described with reference to FIG. 2.

For the purpose of description, FIG. 2 illustrates the fire alarm control panel FA, the SCI, and terminal equipment. The SCI is described later with reference to FIG. 3.

(Fire Alarm Control Panel)

The fire alarm control panel FA includes a control section 11, the display and operation section 12, the storage section 13, and a transmitting and receiving section 14.

The control section 11 controls the operation of the entire system including the display and operation section 12 and the transmitting and receiving section 14 based on control programs stored in advance in the storage section 13.

The display and operation section 12 includes: display means such as a screen and a lamp, for displaying the fire information detected by the terminal equipment or the states of the respective terminal equipment; and operation means such as a touch panel and a button, for operating the fire alarm control panel FA and the respective terminal equipment.

The transmitting and receiving section 14 is controlled by the control section 11 to transmit signals to the respective terminal equipment and receive signals transmitted from the respective terminal equipment.

The storage section 13 stores programs and various data to operate the control section 11.

(Terminal Equipment)

FIG. 2 illustrates a detector, for example, a smoke detector or a heat detector, as an example of the terminal equipment. The detector includes a control section 21, a power supply section 22, a sensor 23, and a transmitting and receiving section 24.

In the detector, the sensor 23 detects a temperature and a concentration of smoke and the transmitting and receiving section 24 transmits detected information to the fire alarm control panel FA.

(Configuration of SCI)

A configuration of the SCI according to the first embodiment is described.

Figure 3:
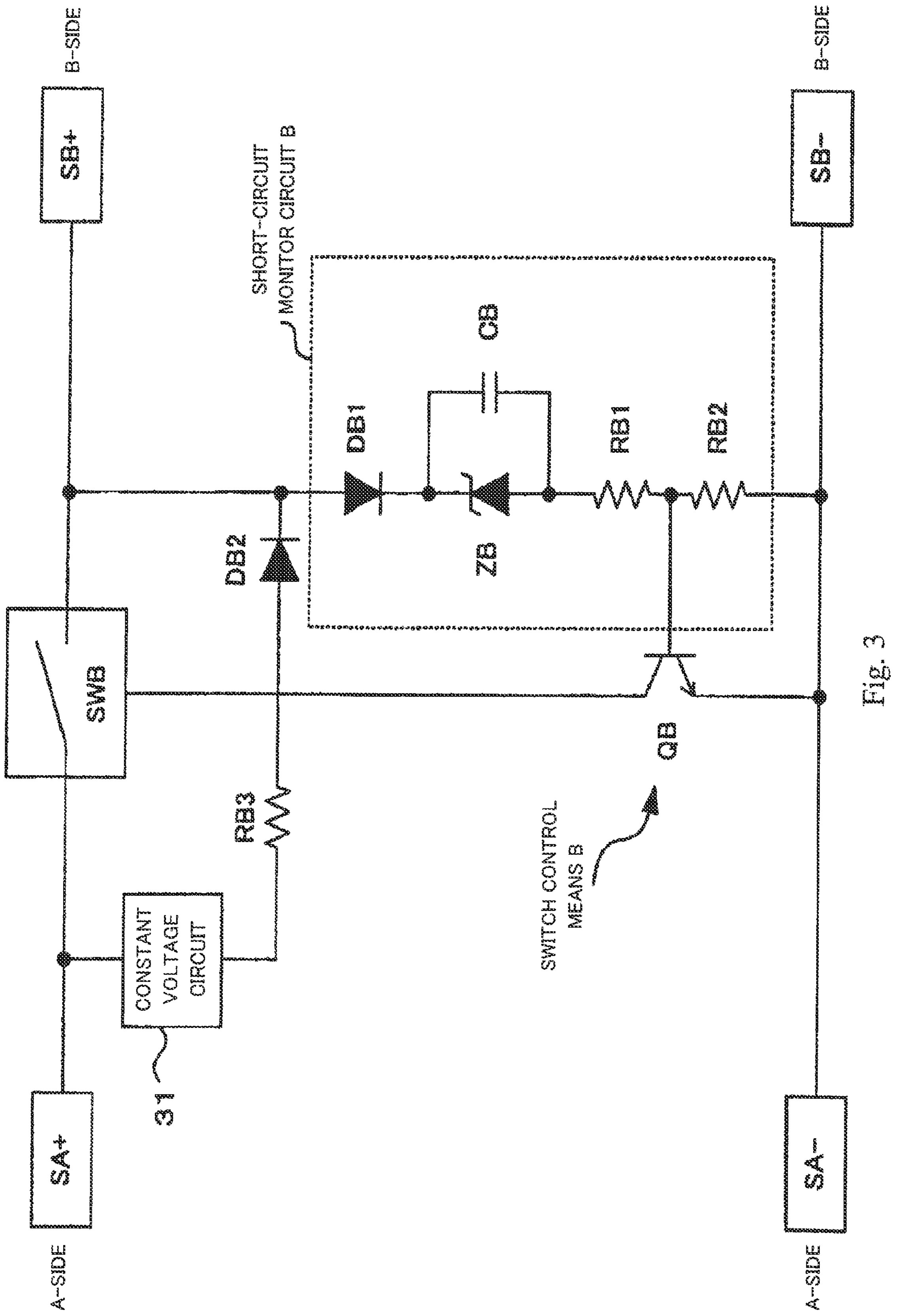
FIG. 3 is a circuit diagram illustrating the SCI according to the first embodiment of the present invention.

FIG. 3 is a circuit diagram illustrating the SCI according to the first embodiment. In FIG. 3, signal lines of the fire alarm control panel FA are connected to A-side (primary) terminals SA+ and SA− and signal lines of the terminal equipment are connected to B-side (secondary) terminals SB+ and SB−.

The SCI includes a switch SWB for connecting the A-side terminal SA+ to the B-side terminal SB+, a constant voltage circuit 31, a resistor RB3 which is current limiting means, a short-circuit monitor circuit B, and switch control means B. The short-circuit monitor circuit B corresponds to short-circuit determination means in the present invention.

The constant voltage circuit 31 includes one end side connected to a primary wiring for connecting the switch SWB to the A-side terminal SA+ and the other end side connected to the short-circuit monitor circuit B through the resistor RB3 which is the current limiting means and a diode DB2. An anode of the diode DB2 is provided on the constant voltage circuit 31 side.

The short-circuit monitor circuit B is connected to the primary wiring connected to the switch SWB through the constant voltage circuit 31, and connected to a secondary wiring for connecting the switch SWB to the B-side terminal SB+.

In the short-circuit monitor circuit B, an anode of a diode DB1 is provided on the constant voltage circuit 31 side. A cathode of the diode DB1 is connected in series to cathodes of a capacitor CB and a Zener diode ZB which are connected in parallel. Anodes of the capacitor CB and the Zener diode ZB are connected in series to resistors RB1 and RB2.

The switch control means B includes a transistor QB. A base of the transistor QB is connected to an intermediate point between the resistors RB1 and RB2 of the short-circuit monitor circuit, and an emitter thereof is connected to one end of the resistor RB2 which is opposite from the other end thereof which is connected to the base. When a current flows into the short-circuit monitor circuit B, the current flows through the resistor RB2 to generate a voltage between both the ends of the resistor RB2, and hence the base and emitter of the transistor QB are biased to turn on the transistor QB. Therefore, the switch SWB is on/off-controlled. The switch control means B may be a field effect transistor (FET) or an analog switch.

[Operation of SCI]

The operation of the SCI according to the first embodiment is described.

(Normal State)

The operation in the normal state (state in which short circuit does not occur) is described. In an initial state in which the fire alarm control panel FA is not powered on, the switch SWB is in the off-state.

When the fire alarm control panel FA is powered on, a signal voltage is applied to the A-side of the signal line SG to start communication.

When the signal voltage is applied to the A-side of the signal line SG, the signal voltage is applied between the A-side terminals SA+ and SA− of the SCI. The signal voltage is also applied to the constant voltage circuit 31.

A constant voltage is applied from the constant voltage circuit 31 to the terminal equipment connected to the B-side terminals SB+ and SB− and the short-circuit monitor circuit B through the resistor RB3 and the diode DB2. The constant voltage applied from the constant voltage circuit 31 is a voltage lower than the low-level voltage of the signal applied from the fire alarm control panel FA to the signal line SG (A-side).

When the constant voltage is applied to the short-circuit monitor circuit B, a charge current bypasses the Zener diode ZB and flows into the capacitor CB because the capacitor CB is not initially charged. Therefore, immediately when the constant voltage is applied, a current flows through the resistors RB1 and RB2, and hence the transistor QB is turned on. When the transistor QB is turned on, the switch SWB is turned on.

When the switch SWB is turned on, the A-side and B-side of the signal line SG are connected to each other, and hence the fire alarm control panel FA is connected to the terminal equipment. Therefore, the signal voltage is supplied to the terminal equipment connected to the B-side to start communication.

In contrast to this, when the signal voltage is applied to the B-side, the voltage is directly applied from the signal line SG to the short-circuit monitor circuit B. When the applied voltage exceeds a Zener voltage of the Zener diode ZB, the Zener diode ZB is turned on. Therefore, even after the capacitor CB is completely charged and the charge current does not flow thereinto, the current continues to flow into the resistors RB1 and RB2, and hence the transistor QB continues to be in the on-state. The B-side of the signal line SG is applied with the signal voltage and thus becomes a voltage higher than the constant voltage of the constant voltage circuit 31. Thus, a power supply voltage is not supplied from the constant voltage circuit 31 to the short-circuit monitor circuit B by the off operation of the diode DB2.

(Short-Circuit State)

An operation in a case where short circuit occurs on the B-side of the signal line SG is described.

When the B-side is short-circuited, a voltage between the B-side terminals SB+ and SB− reduces. When the voltage reduces to a predetermined voltage (hereinafter, referred to as short-circuit detection voltage), the Zener diode ZB of the short-circuit monitor circuit B is turned off, and hence a current does not flow into the resistors RB1 and RB2. Then, the transistor QB is turned off and the switch SWB is turned off, and hence the A-side wiring is disconnected from the B-side wiring. That is, the Zener voltage of the Zener diode ZB is a first short-circuit detection threshold in the present invention. The A-side wiring is disconnected from the B-side wiring, and hence the A-side wiring is not affected by the short circuit of the B-side wiring. The capacitor CB is discharged.

In a case where a complete short circuit does not occur, when the voltage between the B-side terminals SB+ and SB− is lower than the Zener voltage of the Zener diode ZB, a current does not flow into the resistors RB1 and RB2. Then, the transistor QB is turned off, and hence the switch SWB is turned off.

After the A-side wiring is disconnected from the B-side wiring, the signal voltage is not applied to the B-side of the signal line SG, and hence the B-side of the signal line SG becomes a voltage lower than the constant voltage of the constant voltage circuit 31. In such a state, when the constant voltage from the constant voltage circuit 31 is applied between the B-side terminals SB+ and SB− through the resistor RB3 and the diode DB2, the recovery from short circuit may be monitored. In this case, the B-side terminals SB+ and SB− are short-circuited, and hence a short-circuit current flows therethrough. However, in order to reduce the short-circuit current to a value by which the A-side is not affected, a resistance value of the resistor RB3 which is the current limiting means is adjusted.

In order to monitor the recovery from short circuit, the constant voltage circuit is provided to reduce the voltage applied between the terminals of the signal line which are located on the short-circuit-monitored side (B-side terminals SB+ and SB− in the first embodiment) to a value equal to or lower than the low-level voltage. The constant voltage circuit is provided, and hence the change in short-circuit current depending on changes in high-level voltage and low-level voltage of the signal voltage is suppressed. However, when the change in short-circuit current which is caused by the changes in voltages is within a range in which the influence on a wiring which is not short-circuited is allowed and a change in current supplied to the terminal equipment at the time of recovery from short circuit is allowed, the constant voltage circuit is not necessarily provided.

The current limiting means may include an element through which a constant current may flow, for example, a constant current diode.

(Recovery from Short-Circuit State)

An operation in a case where short circuit occurs to disconnect the A-side wiring and the B-side wiring from each other and then recovery from the short circuit is made is described.

When the short circuit of the B-side is eliminated, the constant voltage is applied from the constant voltage circuit 31 to the terminal equipment connected to the B-side terminals SB+ and SB− and the short-circuit monitor circuit B through the resistor RB3 and the diode DB2.

When the constant voltage is applied to the short-circuit monitor circuit B, the charge current bypasses the Zener diode ZB and flows into the capacitor CB because the capacitor CB is discharged by short circuit. Therefore, immediately when the constant voltage is applied, a current flows into the resistors RB1 and RB2 through the capacitor CB, and hence the transistor QB is turned on. When the transistor QB is turned on, the switch SWB is turned on. That is, the voltage capable of turning on the transistor QB by the current flowing through the capacitor CB is a first short-circuit recovery threshold for detecting the recovery from short circuit in the present invention.

When the switch SWB is turned on, the A-side and B-side of the signal line SG are connected to each other, and hence the fire alarm control panel FA is connected to the terminal equipment. Therefore, the signal voltage is restarted to be supplied to the terminal equipment connected to the B-side to restart communication.

An operation of recovery from short circuit in a case where the capacitor CB connected in parallel to the Zener diode ZB as in the short-circuit monitor circuit B in the first embodiment is not provided is described. In this case, the Zener voltage of the Zener diode ZB is a threshold voltage for detecting short circuit and recovery from the short circuit.

In the case where the capacitor CB is not provided, even when the B-side of the signal line SG is recovered from short circuit, the voltage applied to the short-circuit monitor circuit B is low during the charging of capacitor components such as a stray capacitor formed on the B-side of the signal line SG and a backup capacitor provided in an inner portion of the terminal equipment, and hence the Zener diode ZB is not turned on. Therefore, the transistor QB is maintained in the off-state and thus the switch SWB is not turned on.

When the voltage applied to the short-circuit monitor circuit B increases with the progress of charging of the capacitor components connected to the B-side, the Zener diode ZB is turned on and thus the transistor QB is turned on. Then, the switch SWB is turned on. When such a series of operation is performed, the A-side and B-side of the signal line SG are electrically connected to each other, and hence the fire alarm control panel FA is connected to the terminal equipment.

As described above, in order to prevent the A-side from being affected by short circuit on the B-side, the current flowing into the B-side is limited by the resistor RB3. Even when the signal line SG is recovered from short circuit, the switch SWB is not turned on during the charging of the capacitor component provided in the inner portion of the terminal equipment. Therefore, it takes some time to charge the capacitor component provided in the inner portion of the terminal equipment located on the B-side because the current flowing into the B-side is limited. That is, it takes time to reconnect the fire alarm control panel FA to the terminal equipment.

When it takes some time to reconnect the fire alarm control panel FA to the terminal equipment after the recovery from the short circuit, the following problems may occur.

For example, when it takes time to apply the signal voltage to the detector which is the terminal equipment, smoke or heat cannot be detected before the terminal equipment is activated, and hence the detection of fire may be delayed. Further, the short circuit may be detected by the short-circuit monitor circuit B erroneously operated because of the influence of noise to disconnect the A-side and B-side of the signal line SG from each other. In such a case, when the recovery takes time, an interruption time of communication between the fire alarm control panel FA and the terminal equipment lengthens. Therefore, although the terminal equipment is actually connected, the fire alarm control panel FA may determine that the terminal equipment is disconnected and generate the no-response failure alarm.

When a period in which the voltage is not applied to the terminal equipment extends, the terminal equipment is reset.

In order to activate a microcomputer (not shown) which is a part of the control section of the terminal equipment located on the B-side after several tens of milliseconds from the recovery from the short circuit, a rising current rapidly increases. Unless the switch SWB is turned on and thus the current is supplied to the terminal equipment before the rapid increase of the rising current, the current cannot be sufficiently supplied to the terminal equipment because the current is limited by the resistor RB3. Therefore, the microcomputer cannot be normally activated and the terminal equipment may be erroneously operated. In order to avoid the terminal equipment from being erroneously operated, it is necessary to limit the number of connected terminal equipment to be able to achieve normal activation with a limited current.

As described above, in the SCI according to the first embodiment, when the secondary voltage becomes lower than the Zener voltage (short-circuit detection voltage) of the Zener diode ZB, the short circuit is detected. In addition, when the voltage of the signal line SG becomes the predetermined voltage (short-circuit recovery voltage) lower than the short-circuit detection voltage, the recovery from the short circuit is detected. Therefore, a period from the time when the signal line SG is recovered from the short circuit to the time when the recovery from the short-circuit is detected by the short-circuit monitor circuit B may be shortened. Thus, a period from the time when the signal line SG is actually recovered from the short circuit to the time when the connection between the primary side and secondary side of the SCI is recovered may be shortened.

Therefore, for example, in the fire alarm system as described in the first embodiment, a period of disconnection between the fire alarm control panel FA and the terminal equipment, which is caused by the short circuit, may be shortened, and hence time except fire monitoring time may be reduced, and hence fire may be more reliably detected. Unnecessary no-response failure alarm may be suppressed from being generated. A larger number of terminal equipment may be connected. The terminal equipment may be suppressed from being erroneously operated.

Second Embodiment

In a second embodiment, a case where the SCI according to the present invention is applied to a fire alarm system in which a fire alarm control panel FA and terminal equipment are connected through a loop signal line is described as an example.

Figure 4:
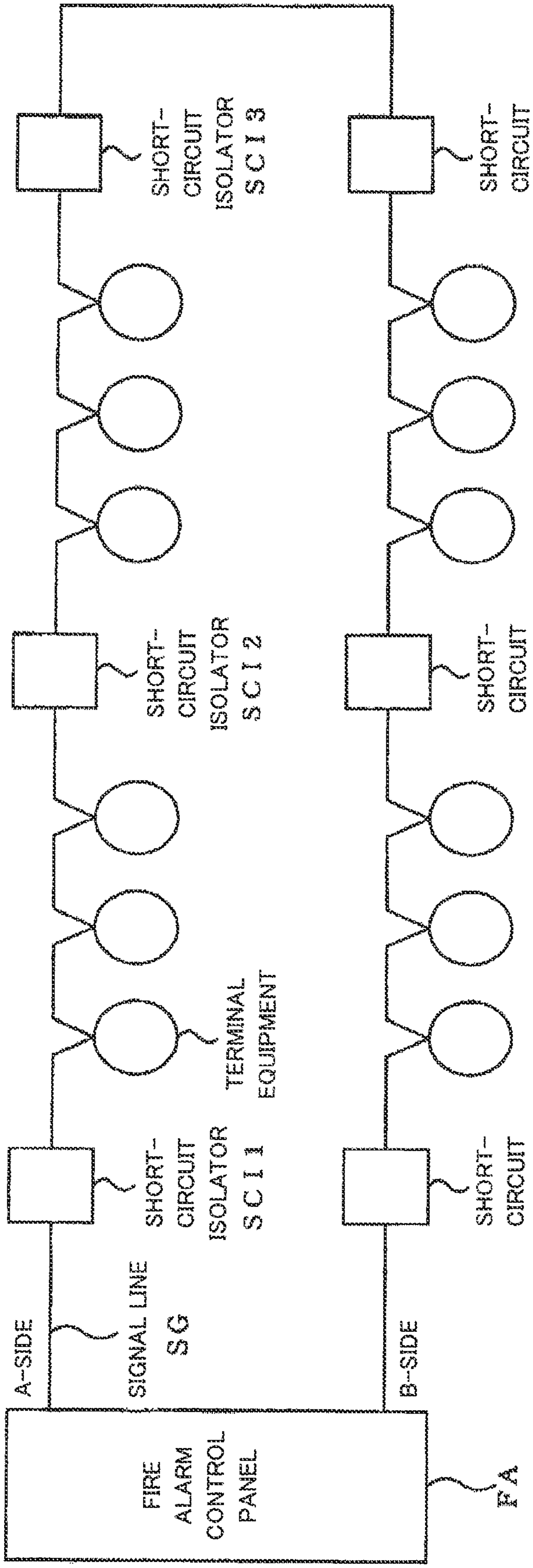
FIG. 4 is an overall configuration diagram illustrating a fire alarm system including an SCI according to a second embodiment of the present invention.

FIG. 4 is an overall configuration diagram illustrating the fire alarm system in the second embodiment. The fire alarm control panel FA is connected to the terminal equipment through the loop signal line. The fire alarm control panel FA may perform voltage application and signal transmission from a terminal A and a terminal B. During a normal state, each of voltage application and signal transmission is performed from one of the terminals (for example, terminal A). During an abnormal state, each of the voltage application and signal transmission is performed from the other terminal (terminal B) simultaneously with the one of the terminals.

Short-circuit isolators SCI1 to SCI6 are connected to a path of a signal line SG wired in loop. The terminal equipment is connected between the respective SCIs.

(Configuration of SCI)

Next, a configuration of the SCI according to the second embodiment is described.

Figure 5:
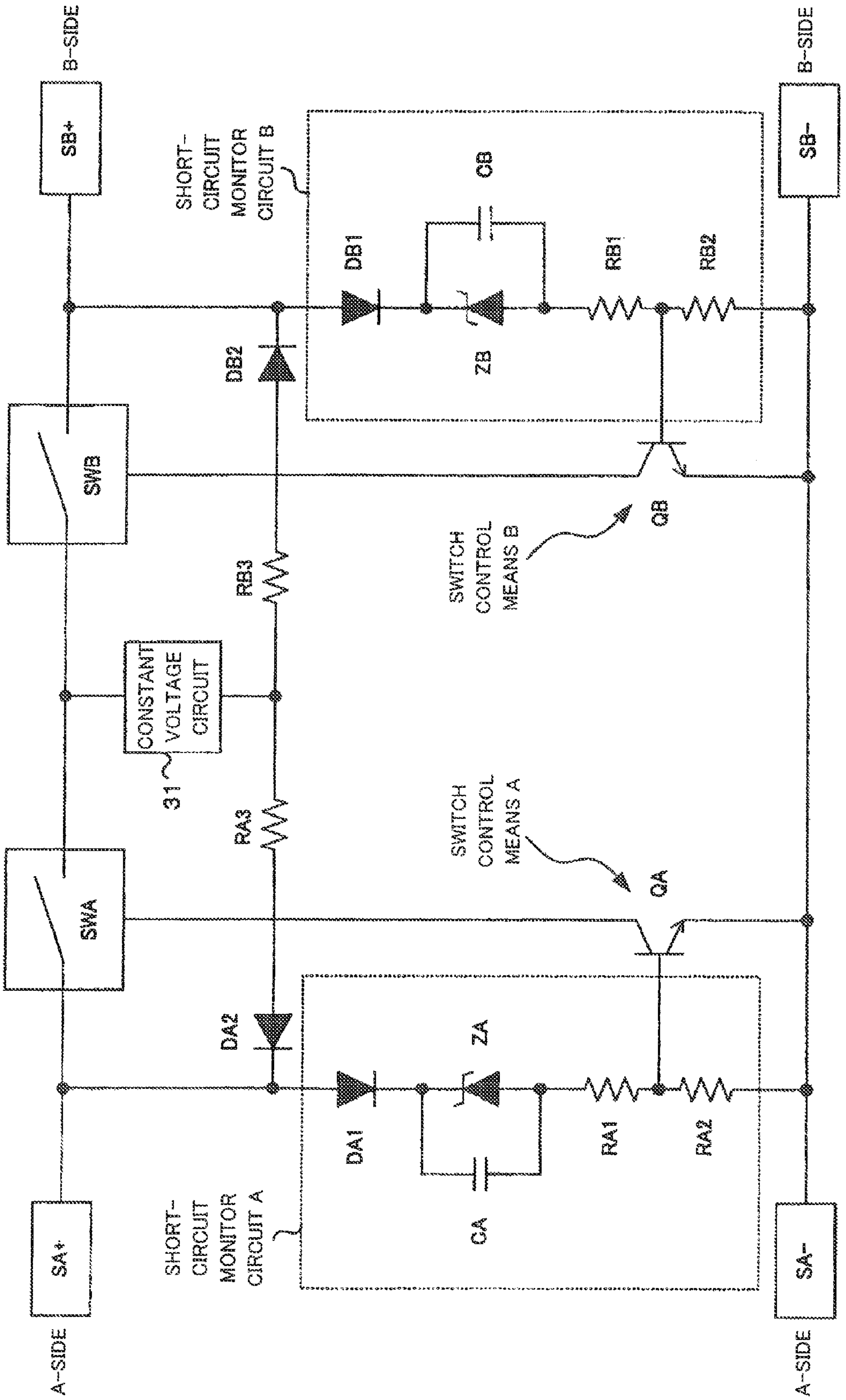
FIG. 5 is a circuit diagram illustrating the SCI according to the second embodiment of the present invention.

FIG. 5 is a circuit diagram illustrating the SCI according to the second embodiment. In FIG. 5, signal lines on the terminal-A side of the fire alarm control panel FA are connected to A-side (primary) terminals SA+ and SA− and signal lines on the terminal-B side of the fire alarm control panel FA are connected to B-side (secondary) terminals SB+ and SB−.

As illustrated in FIG. 5, the SCI according to the second embodiment includes: the constant voltage circuit 31 used in common; and two circuit groups which are provided on the A-side and the B-side and symmetric with respect to the constant voltage circuit 31, the two circuit groups each having the same configuration as the SCI including the short-circuit monitor circuit, the switch control means, and the current limiting means as described in the first embodiment described above.

To be more specific, switches SWA and SWB are connected in series between the A-side and B-side of the signal line. A connection side wiring for connecting the switches SWA and SWB in series is connected to the constant voltage circuit 31. The switch SWA is connected to the A-side terminal SA+ through a primary wiring. The primary wiring is connected to a short-circuit monitor circuit A. The short-circuit monitor circuit A is connected to the connection side wiring through current limiting means RA3. Switch control means A for controlling an on/off-state of the switch SWA is connected to the short-circuit monitor circuit A. The switch SWB is connected to the B-side terminal SB+ through a secondary wiring. The secondary wiring is connected to a short-circuit monitor circuit B. Switch control means B for controlling an on/off-state of the switch SWB is connected to the short-circuit monitor circuit B.

The short-circuit monitor circuit A corresponds to first short-circuit determination means in the present invention. The switch control means A corresponds to first switch control means in the present invention. The short-circuit monitor circuit B corresponds to second short-circuit determination means in the present invention. The switch control means B corresponds to second switch control means in the present invention.

The short-circuit monitor circuits A and B in the second embodiment have the same circuit configuration as the short-circuit monitor circuit B described above in the first embodiment.

[Operation of SCI]

Next, the operation of the SCI according to the second embodiment is described. Even when a power supply voltage is supplied from any one of the A-side and the B-side, the SCI according to the second embodiment may be operated. Even when any one of A-side and the B-side is short-circuited, the short-circuited side may be disconnected.

(Normal State)

First, the operation in the normal state (state in which short circuit has not occurred) is described. In an initial state, the switches SWA and SWB are in the off-state. In this case, assume that a signal voltage is applied from the terminal-A side of the fire alarm control panel FA.

When the fire alarm control panel FA is powered on, the signal voltage is applied to the A-side of the signal line SG to start communication.

When the signal voltage is applied to the A-side of the signal line SG, the signal voltage is applied between the A-side terminals SA+ and SA− of the SCI. When wirings connected to the A-side terminals SA+ and SA− of the SCI are normal, a charge current bypasses a Zener diode ZA and flows into a capacitor CA because the capacitor CA is not initially charged. Then, the current flows through resistors RA1 and RA2, and hence the transistor QA is turned on. When the transistor QA is turned on, a switch SWA is turned on, and hence the connection side wiring for the switches SWA and SWB is connected to the A-side terminal SA+ of the SCI. After that, the signal voltage is applied to the constant voltage circuit 31.

In the short-circuit monitor circuit A, the voltage is continuously applied from the signal line SG. When the applied voltage exceeds a Zener voltage of the Zener diode ZA, the Zener diode ZA is turned on. Therefore, even after the capacitor CA is completely charged and the charge current does not flow thereinto, the current continues to flow into the resistors RA1 and RA2, and hence the transistor QA continues to be in the on-state.

When the signal voltage is applied to the constant voltage circuit 31, a constant voltage is applied to the short-circuit monitor circuit B through the resistor RB3 and the diode DB2. The constant voltage applied from the constant voltage circuit 31 is a voltage lower than the low-level voltage of the signal applied from the fire alarm control panel FA to the signal line SG (A-side).

When the constant voltage is applied to the short-circuit monitor circuit B, a charge current bypasses the Zener diode ZB and flows into the capacitor CB because the capacitor CB is not initially charged. Therefore, immediately when the constant voltage is applied, a current flows through the resistors RB1 and RB2, and hence the transistor QB is turned on. When the transistor QB is turned on, the switch SWB is turned on.

When the switch SWB is turned on, the A-side and B-side of the signal line SG are connected to each other, and hence the fire alarm control panel FA is connected to the terminal equipment. Therefore, the signal voltage is also supplied to the terminal equipment connected to the B-side to start communication.

On the other hand, when the signal voltage is applied to the B-side, the voltage is directly applied from the signal line SG to the short-circuit monitor circuit B. When the applied voltage exceeds a Zener voltage of the Zener diode ZB, the Zener diode ZB is turned on. Therefore, even after the capacitor CB is completely charged and the charge current does not flow thereinto, the current continues to flow into the resistors RB1 and RB2, and hence the transistor QB continues to be in the on-state. The B-side of the signal line SG is applied with the signal voltage and thus becomes a voltage higher than the constant voltage of the constant voltage circuit 31. Thus, a power supply voltage is not supplied from the constant voltage circuit 31 to the short-circuit monitor circuit B by the off operation of the diode DB2.

Through such a series of operation, the A-side and B-side of the signal line SG in the short-circuit isolator SCI1 are connected to each other. Next, the signal voltage is applied to the short-circuit isolator SCI2 and the A-side and B-side of the signal line SG in the short-circuit isolator SCI2 are connected to each other in the same manner. Therefore, the A-side and B-side of the signal line SG in each of the short-circuit isolators SCI1, SCI2, SCI3, . . . are connected to each other, and hence the signal voltage is input to all the terminal equipment and the terminal B of the fire alarm control panel FA.

(Short-Circuit State)

An operation in a case where short circuit occurs on the B-side of the signal line SG is described.

When the B-side is short-circuited, a voltage between the B-side terminals SB+ and SB− reduces. When the voltage reduces to a predetermined voltage (hereinafter referred to as short-circuit detection voltage), the Zener diode ZB of the short-circuit monitor circuit B is turned off, and hence a current does not flow into the resistors RB1 and RB2. Then, the transistor QB is turned off and the switch SWB is turned off, and hence the A-side wiring is disconnected from the B-side wiring. That is, the Zener voltage of the Zener diode ZB is a second short-circuit detection threshold in the present invention. The A-side wiring is disconnected from the B-side wiring, and hence the A-side wiring is not affected by the short circuit of the B-side wiring. The capacitor CB is discharged. The switch SWA located on the A-side is maintained in the on-state.

The fire alarm system in the second embodiment has the loop signal line. Therefore, when short circuit occurs and thus the signal voltage is not input to the terminal B of the fire alarm control panel FA, the fire alarm control panel FA starts voltage application and signal transmission from the B-side terminal.

Then, an SCI which is located closest to a short-circuited portion and on the B-side terminal of the tire alarm control panel FA detects the short circuit in the same manner. That is, the Zener voltage of the Zener diode ZA of FIG. 5 is the first short-circuit detection threshold in the present invention to detect the occurrence of short circuit.

For example, when short circuit occurs between the short-circuit isolators SCI4 and SCI5 illustrated in FIG. 4, the short-circuit isolators SCI4 and SCI5 detect the short circuit and performs the wiring disconnection operation in the same manner. The signal voltage application and signal transmission to the short-circuit isolators SCI1 to SCI4 disconnected by the short circuit are performed from the A-side terminal of the fire alarm control panel FA. The signal voltage application and signal transmission to the short-circuit isolators SCI6 and SCI5 are performed from the B-side terminal of the fire alarm control panel FA.

In FIG. 5, after the A-side wiring is disconnected from the B-side wiring, the signal voltage is not applied to the B-side of the signal line SG, and hence the B-side of the signal line SG becomes a voltage lower than the constant voltage of the constant voltage circuit 31. Accordingly, when the constant voltage from the constant voltage circuit 31 is applied between the B-side terminals SB+ and SB− through the resistor RB3 and the diode DB2, the recovery from short circuit may be monitored. In this case, the B-side terminals SB+ and SB− are short-circuited, and hence a short-circuit current flows therethrough. However, in order to reduce the short-circuit current to a value by which the A-side is not affected, a resistance value of the resistor RB3 which is the current limiting means is adjusted.

In order to monitor the recovery from short circuit, the constant voltage circuit is provided to reduce the voltage applied between the terminals of the signal line which are located on the short-circuit-monitored side (A-side and B-side terminals SA+ and SA− and SB+ and SB− in the second embodiment) to a value equal to or lower than the low-level voltage. The constant voltage circuit is provided, and hence the change in short-circuit current depending on changes in high-level voltage and low-level voltage of the signal voltage is suppressed. However, when the change in short-circuit current which is caused by the changes in voltages is within a range in which the influence on a wiring which is not short-circuited is allowed and a change in current supplied to the terminal equipment at the time of recovery from short circuit is allowed, the constant voltage circuit is not necessarily provided.

The current limiting means may include an element through which a constant current may flow, for example, a constant current diode.

(Recovery from Short-Circuit State)

An operation in a case where short circuit occurs to disconnect the A-side wiring and the B-side wiring from each other and then recovery from the short circuit is made is described.

When the short circuit of the B-side is eliminated, the constant voltage is applied from the constant voltage circuit 31 to the terminal equipment connected to the B-side terminals SB+ and SB− and the short-circuit monitor circuit B through the resistor RB3 and the diode DB2.

When the constant voltage is applied to the short-circuit monitor circuit B, the charge current bypasses the Zener diode ZB and flows into the capacitor CB because the capacitor CB is discharged by short circuit. Therefore, immediately when the constant voltage is applied, a current flows into the resistors RB1 and RB2, and hence the transistor QB is turned on. When the transistor QB is turned on, the switch SWB is turned on. That is, the voltage capable of turning on the transistor QB by the current flowing through the capacitor CB is a second short-circuit recovery threshold for detecting recovery from the short circuit in the present invention. Similarly, the voltage capable of turning on the transistor QA by the current flowing through the capacitor CA is the first short-circuit recovery threshold for detecting recovery from the short circuit in the present invention.

When the switch SWB is turned on, the A-side and B-side of the signal line SG are connected to each other, and hence the fire alarm control panel FA is connected to the terminal equipment. Therefore, the signal voltage is restarted to be supplied to the terminal equipment connected to the B-side to restart communication.

The case where the B-side is short-circuited is described above as an example. Even when the A-side is short-circuited, the disconnection of the signal line SG after the detection of short circuit and the reconnection of the signal line SG after recovery from the short circuit may be performed in the same manner.

As described above, the SCIs according to the second embodiment are connected to the loop signal line. Even when short circuit occurs in any of the primary wiring and the secondary wiring, the short circuit may be detected. When the voltage of the signal line SG becomes the predetermined short-circuit recovery voltage lower than the short-circuit detection voltage, recovery from the short circuit is detected, and hence the same effect as in the first embodiment may be obtained.

The second embodiment describes the fire alarm system in which the terminal equipment is connected to the loop signal line. During the normal state, each of the voltage application and signal transmission is performed from one of the terminals (for example, terminal A). During the abnormal state, each of the voltage application and signal transmission is performed from the other terminal (terminal B). The present invention may also be applied to a configuration in which each of the voltage application and signal transmission is performed always from both side terminals.

Third Embodiment

The first embodiment describes the example of the directional SCI capable of detecting the short circuit occurring in the one-side (secondary) wiring of the SCI and recovery from the short circuit. The second embodiment describes the example of the SCI capable of detecting the short circuit occurring in both side wirings on the loop signal line which may be applied with voltages from both sides and the recovery from the short circuit. In a third embodiment, an SCI capable of detecting short circuit occurring in a wiring extended from a loop signal line which may be applied with voltages from both sides and recovery from the short circuit is described. The number of extended wirings is not limited to one and a plurality of extended wirings may be provided. In the third embodiment, an SCI which has four terminals and may detect short circuit in four directions is described as an example.

Figure 6:
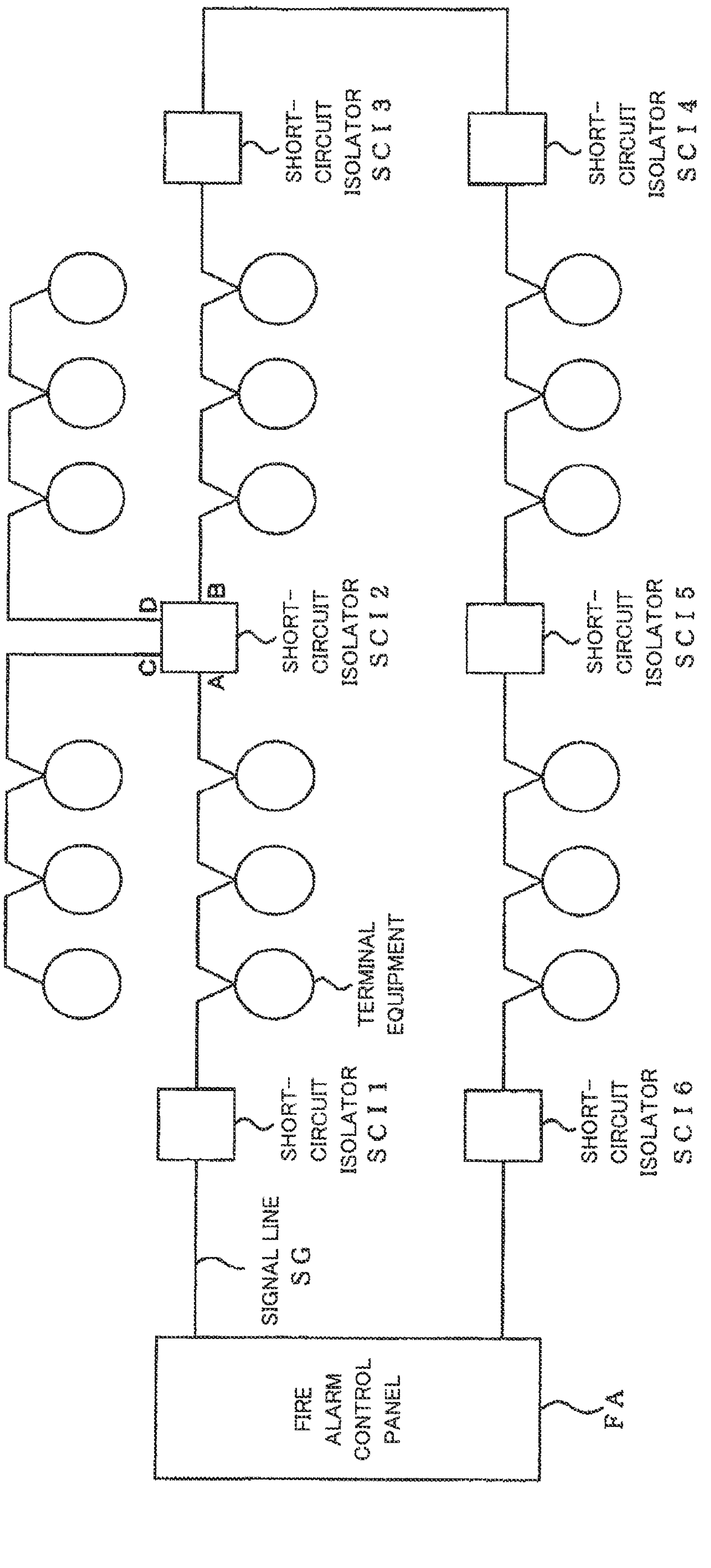
FIG. 6 is an overall configuration diagram illustrating a fire alarm system including an SCI according to a third embodiment of the present invention.

FIG. 6 is an overall configuration diagram illustrating a fire alarm system in the third embodiment. The fire alarm control panel FA is connected to the terminal equipment through the loop signal line. The short-circuit isolator SCI2 is connected to four signal lines SG. Four connection portions of the short-circuit isolator SCI2 are denoted by A, B, C, and D.

Figure 7:
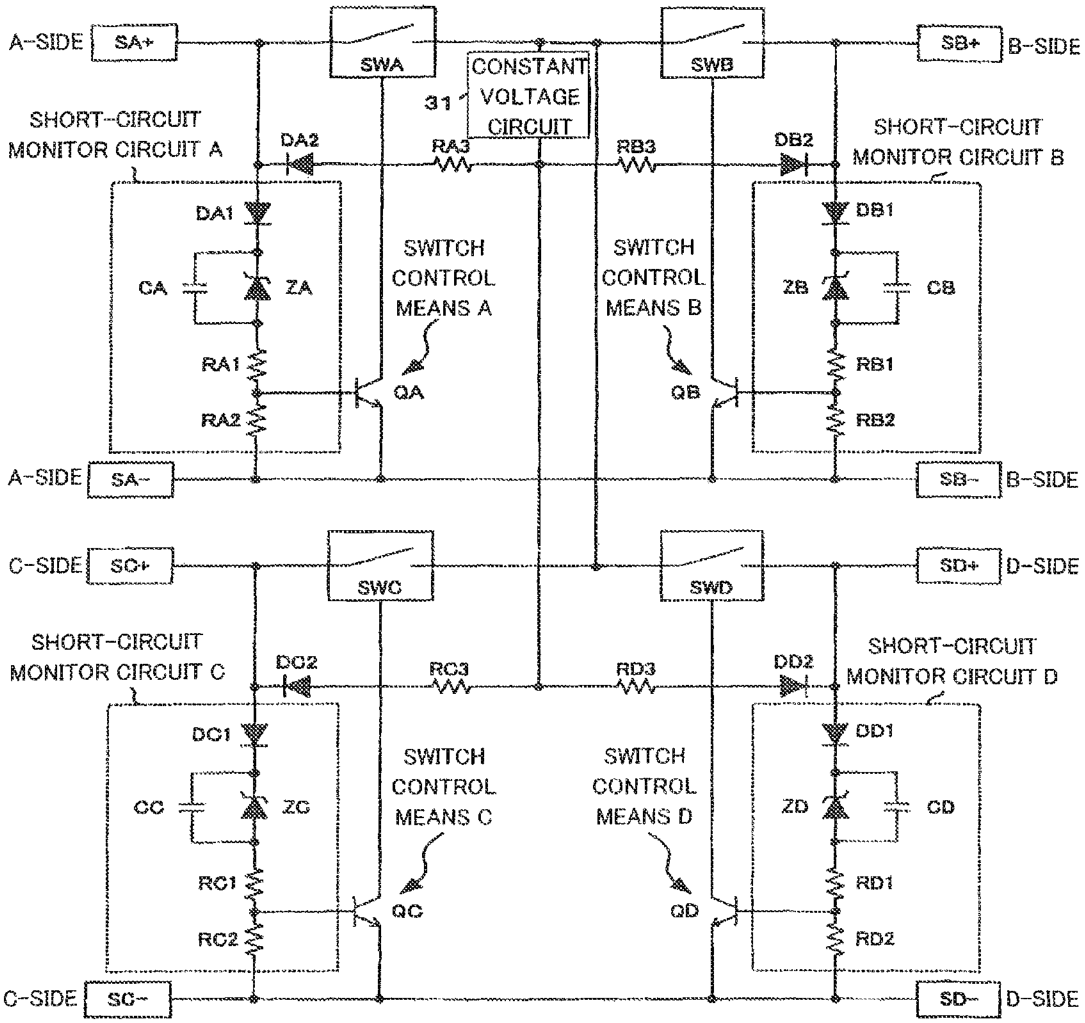
FIG. 7 is a circuit diagram illustrating the SCI according to the third embodiment of the present invention.

The operation of the SCI2 according to the third embodiment is described,

FIG. 7 is a circuit diagram illustrating the short-circuit isolator SCI2 according to the third embodiment. The short-circuit isolator SCI2 illustrated in FIG. 7 includes the constant voltage circuit 31 used in common, and four circuit groups which are provided on the A-side, the B-side, the C-side, and the D-side with respect to the constant voltage circuit 31 and each have the same configuration as the SCI described above in the first embodiment. The short-circuit isolator SCI2 according to the third embodiment is a circuit which operates even when a power supply voltage is supplied from any one of the SA-side and the SB-side, and disconnects a short-circuit side even when any one of the SA-side, the SB-side, the SC-side, and the SD-side is short-circuited.

As illustrated in FIG. 7, the short-circuit isolator SCI2 according to the third embodiment includes the constant voltage circuit 31 used in common, and the plurality of circuit groups each having the same configuration as the SCI including the switch, the short-circuit monitor circuit, the current limiting means, and the switch control means as described above in the second embodiment.

To be more specific, the upper circuit and the lower circuit which are illustrated in FIG. 7 each have the same configuration as the circuit described above in the second embodiment. The upper circuit and the lower circuit are connected to each other through a wiring for connecting the connection side wiring for the switches SWA and SWB to a connection side wiring for switches SWC and SWD. That is, short-circuit monitor circuits A to D are connected to be supplied with the constant voltage from the constant voltage circuit 31.

Next, the operation of the SCI according to the third embodiment is described.

(Normal State)

The operation in the normal state (state in which short circuit has not occurred) is described. In an initial state, the switches SWA, SWB, SWC, and SWD are in the off-state. In this case, assume that a signal voltage is applied from the terminal-A side of the fire alarm control panel FA.

When the fire alarm control panel FA is powered on, a signal voltage is applied to the A-side of the signal line SG to start communication.

When the signal voltage is applied to the A-side of the signal line SG, the signal voltage is applied between the A-side terminals SA+ and SA− of the SCI. When wirings connected to the A-side terminals SA+ and SA− of the SCI are normal, the Zener diode ZA in the short-circuit monitor circuit A is turned on, and hence a current flows through the resistors RA1 and RA2 and the transistor QA is turned on. When the transistor QA is turned on, the switch SWA is turned on, and hence the connection side wiring for the switches SWA and SWB is connected to the connection side wiring for the switches SWC and SWD. After that, the signal voltage is applied to the constant voltage circuit 31.

After the signal voltage is applied to the constant voltage circuit 31, the same operation as in the first embodiment is performed, and hence the transistors QB, QC, and QD are turned on and then the switches SWB, SWC, and SWD are turned on. Therefore, the signal voltage is applied to the terminal equipment connected to the signal lines SG located on the B-side, the C-side, and the D-side and communication between the fire alarm control panel FA and the respective terminal equipment starts.

(Short-Circuit State)

An operation in a case where short circuit occurs on the C-side of the signal line SG is described.

When the C-side is short-circuited, a voltage between the C-side terminals SC+ and SC− reduces. When the voltage reduces to a predetermined voltage, the Zener diode ZC of the short-circuit monitor circuit C is turned off, and hence a current does not flow into the resistors RC1 and RC2. Then, the transistor QC is turned off and the switch SWC is turned off, and hence the C-side wiring is disconnected from all of the A-side wiring, the B-side wiring, and the D-side wiring. The C-side wiring is disconnected from all the wirings, and hence the other wirings are not affected by the short circuit of the C-side wiring. A capacitor CC is discharged. The switches SWA, SWB, and SWD continue to be in the on-state.

After the A-side wiring is disconnected from the C-side wiring, the signal voltage is not applied to the C-side of the signal line SG, and hence the C-side of the signal line SG becomes a voltage lower than the constant voltage of the constant voltage circuit 31. Accordingly, when the constant voltage from the constant voltage circuit 31 is applied between the C-side terminals SC+ and SC− through the resistor RC3 and the diode DC2, the recovery from short circuit may be monitored. In this case, the C-side terminals SC+ and SC− are short-circuited, and hence a short-circuit current flows therethrough. However, in order to reduce the short-circuit current to a value by which the A-side is not affected, a resistance value of the resistor RC3 is adjusted.

In order to monitor the recovery from short circuit, the constant voltage circuit is provided to reduce the voltage applied between the terminals of the signal line which are located on the short-circuit-monitored side (A-side, B-side, C-side, and D-side terminals SA+ and SA−, SB+ and SB−, SC+ and SC−, and SD+ and SD− in the third embodiment) to a value equal to or lower than the low-level voltage. The constant voltage circuit is provided, and hence the change in short-circuit current depending on changes in high-level voltage and low-level voltage of the signal voltage is suppressed. However, when the change in short-circuit current which is caused by the changes in voltages is within a range in which the influence on a wiring which is not short-circuited is allowed and a change in current supplied to the terminal equipment at the time of recovery from short circuit is allowed, the constant voltage circuit is not necessarily provided.

The current limiting means may include an element through which a constant current may flow, for example, a constant current diode.

(Recovery from Short-Circuit State)

An operation in a case where short circuit occurs to disconnect the A-side wiring and the C-side wiring from each other and then recovery from the short circuit is made is described.

When the short circuit of the C-side is eliminated, the constant voltage is applied from the constant voltage circuit 31 to the terminal equipment connected to the C-side terminals SC+ and SC− and the short-circuit monitor circuit C through the resistor RC3 and the diode DC2.

When the constant voltage is applied to the short-circuit monitor circuit C, the charge current bypasses the Zener diode ZC by the capacitor CC because the capacitor CC is discharged by short circuit. Therefore, immediately when the constant voltage is applied, a current flows into the resistors RC1 and RC2, and hence the transistor QC is turned on. When the transistor QC is turned on, the switch SWC is turned on. That is, the recovery from short circuit may be detected based on a voltage lower than the Zener voltage of the Zener diode ZC which is a threshold voltage for detecting short circuit.

When the switch SWC is turned on, the A-side and C-side of the signal line SG are connected to each other, and hence the fire alarm control panel FA is connected to the terminal equipment. Therefore, the signal voltage is restarted to be supplied to the terminal equipment connected to the C-side to restart communication.

The case where the C-side is short-circuited is described above as an example. Even when the A-side, the B-side, and the C-side are short-circuited, the disconnection of the signal line SG after the detection of short circuit and the reconnection of the signal line SG after recovery from the short circuit may be performed in the same manner.

As described above, the SCIs according to the third embodiment are connected to the loop signal line and the signal lines extended from the loop signal line. Even when short circuit occurs in any of the paths of the connected signal lines, the short circuit may be detected. When the voltage of the signal line SG becomes the predetermined short-circuit recovery voltage lower than the short-circuit detection voltage, recovery from the short circuit is detected, and hence the same effect as in the first embodiment may be obtained.

In each of the first to third embodiments described above, the so-called R-type fire alarm system for detecting a fire in accordance with signals is described as an example. The SCI according to the present invention may be also applied to another system including a power supply line in addition to the fire alarm system.

What is claimed is:

1. A short-circuit isolator to be connected to signal lines to which terminal equipment is connected, which is applied with a voltage from both sides, for detecting short circuit of the signal lines, comprising:

A-side terminals and B-side terminals to which the signal lines are connected;

a first switch means and second switch means that are connected in series through a connection side wiring, a primary signal line electrically coupled to the first switching means through the A-side terminals and a secondary signal line electrically coupled to the second switching means through the B-side terminals;

a first short-circuit determination means that is connected, through a first current limiting means, to the connection side wiring, and that is electrically coupled to the A-side terminals, the first short-circuit determination means configured to detect short circuit when a voltage of the primary signal line is lower than a first short-circuit detection threshold and to detect recovery from the short circuit when the voltage of the primary signal line is higher than a first short-circuit recovery threshold which is a voltage value lower than the first short-circuit detection threshold after the short circuit is detected;

a first switch control means for turning off the first switch means when the short circuit is detected by the first short-circuit determination means and turning on the first switch means when the recovery from the short circuit is detected by the first short-circuit determination means;

a second short-circuit determination means that is connected to the connection side wiring through a second current limiting means and is electrically coupled to the B-side terminals, the second short-circuit determination means configured to detect short circuit when a voltage of the secondary signal line is lower than a second short-circuit detection threshold and to detect recovery from the short circuit when the voltage of the secondary signal line is higher than a second short-circuit recovery threshold which is a voltage value lower than the second short-circuit detection threshold after the short circuit is detected;

a second switch control means for turning off the second switch means when the short circuit is detected by the second short-circuit determination means and turning on the second switch means when the recovery from the short circuit is detected by the second short-circuit determination means;

a third switch means for switching a connection state between a signal line extended from the connection side wiring and a C-side terminal;

a third short-circuit determination means that is connected to the connection side wiring through a third current limiting means and electrically coupled to the C-side terminal, the third short-circuit determination means configured to detect short circuit when a voltage of the extended signal line is lower than a third short-circuit detection threshold and to detect recovery from the short circuit when the voltage of the extended signal line is higher than a third short-circuit recovery threshold which is a voltage value lower than the third short-circuit detection threshold after the short circuit is detected; and a third switch control means for turning off the third switch means when the short circuit is detected by the third short-circuit determination means and turning on the third switch means when the recovery from the short circuit is detected by the third short-circuit determination means.

2. A short-circuit isolator for detecting short circuit of signal lines to which terminal equipment is connected, comprising:

A-side terminals and B-side terminals to which the signal lines are connected;

a switch means for switching a connection state between a primary signal line connected to the A-side terminals and a secondary signal line connected to the B-side terminals;

a short-circuit determination means which is electrically coupled to the A-side terminals through a current limiting means and electrically coupled to the B-side terminals, the short-circuit determination means configured to detect short circuit when a voltage of the secondary signal line is lower than a short-circuit detection threshold and to detect recovery from the short circuit when the voltage of the secondary signal line is higher than a short-circuit recovery threshold which is a voltage value lower than the short-circuit detection threshold after the short circuit is detected; and a switch control means for turning off the switch means when the short circuit is detected by the short-circuit determination means and turning on the switch means when the recovery from the short circuit is detected by the short-circuit determination means, wherein the short-circuit determination means comprises:

a Zener diode that is electrically coupled to the A-side terminal through the current limiting means and electrically coupled to the B-side terminal; and a capacitor connected in parallel to the Zener diode.

3. A short-circuit isolator to be connected to signal lines to which terminal equipment is connected, which is applied with a voltage from both sides, for detecting short circuit of the signal lines, comprising:

A-side terminals and B-side terminals to which the signal lines are connected;

a first switch means and second switch means that are connected in series through a connection side wiring, a primary signal line electrically coupled to the first switching means through the A-side terminals and a secondary signal line electrically coupled to the second switching means through the B-side terminals;

a first short-circuit determination means that is connected, through a first current limiting means, to the connection side wiring, and that is electrically coupled to the A-side terminals, the first short-circuit determination means configured to detect short circuit when a voltage of the primary signal line is lower than a first short-circuit detection threshold and to detect recovery from the short circuit when the voltage of the primary signal line is higher than a first short-circuit recovery threshold which is a voltage value lower than the first short-circuit detection threshold after the short circuit is detected;

a first switch control means for turning off the first switch means when the short circuit is detected by the first short-circuit determination means and turning on the first switch means when the recovery from the short circuit is detected by the first short-circuit determination means;

a second short-circuit determination means that is connected to the connection side wiring through a second current limiting means and is electrically coupled to the B-side terminals, the second short-circuit determination means configured to detect short circuit when a voltage of the secondary signal line is lower than a second short-circuit detection threshold and to detect recovery from the short circuit when the voltage of the secondary signal line is higher than a second short-circuit recovery threshold which is a voltage value lower than the second short-circuit detection threshold after the short circuit is detected;

a second switch control means for turning off the second switch means when the short circuit is detected by the second short-circuit determination means and turning on the second switch means when the recovery from the short circuit is detected by the second short-circuit determination means, wherein at least one of the first and second short-circuit determination means comprises:

a Zener diode that is electrically coupled to the connection side wiring through the corresponding one of the first and second current limiting means and electrically coupled to the corresponding one of the A-side terminal and the B-side terminal; and a capacitor connected in parallel to the Zener diode.

4. The short-circuit isolator according to claim 1, wherein at least one of the first, second, and third short-circuit determination means comprises:

a Zener diode that is electrically coupled to the connection side wiring through the corresponding one of the first, second, and third current limiting means and electrically coupled to the corresponding one of the A-side terminal, the B-side terminal, and the C-side terminal; and a capacitor connected in parallel to the Zener diode.

5. The short-circuit isolator according to claim 2, wherein the switch control means comprises a switching element to be turned on in accordance with a current flowing through one of the Zener diode and the capacitor.

6. The short-circuit isolator according to claim 3, wherein at least one of the first and second switch control means comprises a switching element to be turned on in accordance with a current flowing through one of the Zener diode and the capacitor.

7. The short-circuit isolator according to claim 4, wherein at least one of the first, second, and third switch control means comprises a switching element to be turned on in accordance with a current flowing through one of the Zener diode and the capacitor.

* * * * *